United States Patent
Sun et al.

(10) Patent No.: US 10,986,380 B2
(45) Date of Patent: Apr. 20, 2021

(54) METHOD FOR GENERATING VIDEO MASK INFORMATION, METHOD FOR PREVENTING OCCLUSION FROM BARRAGE, SERVER AND CLIENT

(71) Applicant: Wangsu Science & Technology Co., Ltd., Shanghai (CN)

(72) Inventors: Lei Sun, Shanghai (CN); Fenglei Wang, Shanghai (CN)

(73) Assignee: Wangsu Science & Technology Co., LTD., Shanghai (CN)

( * ) Notice: Subject to any disclaimer, the term of this patent is extended or adjusted under 35 U.S.C. 154(b) by 0 days.

(21) Appl. No.: 16/440,881

(22) Filed: Jun. 13, 2019

(65) Prior Publication Data
US 2020/0288186 A1   Sep. 10, 2020

Related U.S. Application Data

(63) Continuation of application No. PCT/CN2019/077234, filed on Mar. 6, 2019.

(30) Foreign Application Priority Data

Feb. 1, 2019  (CN) .......................... 201910105680.6

(51) Int. Cl.
*H04N 21/234* (2011.01)
*H04N 21/2187* (2011.01)
*G06N 20/00* (2019.01)

(52) U.S. Cl.
CPC ... *H04N 21/23424* (2013.01); *H04N 21/2187* (2013.01); *H04N 21/23418* (2013.01); *G06N 20/00* (2019.01)

(58) Field of Classification Search
CPC ......... H04N 21/23424; H04N 21/2187; H04N 21/23418
See application file for complete search history.

(56) References Cited

U.S. PATENT DOCUMENTS

| 7,249,367 B2 * | 7/2007 | Bove, Jr. .................. H04N 1/64 725/60 |
| 2005/0058344 A1 * | 3/2005 | Xu .......................... H04N 19/21 382/173 |

(Continued)

FOREIGN PATENT DOCUMENTS

| CN | 102521563 A | 6/2012 |
| CN | 105723724 A | 6/2016 |

(Continued)

OTHER PUBLICATIONS

European Extended Search Report dated Jan. 13, 2020, Patent Application No. 19727578.7, 7 pages.

(Continued)

*Primary Examiner* — Nasser M Goodarzi
*Assistant Examiner* — Adil Ocak
(74) *Attorney, Agent, or Firm* — Davis Wright Tremaine LLP (57) ABSTRACT

Some embodiments of the present disclosure provide a method for generating video mask information, a method for preventing occlusion from barrage, a server and a client. The method for generating video mask information comprises: identifying, for any video frame in the video data to be parsed, an area where a target object is located in the video frame; selecting a plurality of geometric figures to fit the area where the target object is located, to allow a combination of the plurality of geometric figures to cover the area where the target object is located; and generating the mask information of the video frame according to a fitting parameter of the plurality of geometric figures, and sending the mask information and data of the video frame to a client synchronously. Some embodiments of the present disclosure are adopted to avoid occlusion caused by the barrage information on the video image while the vast majority of the (Continued)

barrage information remains and reducing a bandwidth consumption of the client.

20 Claims, 4 Drawing Sheets

(56) References Cited

U.S. PATENT DOCUMENTS

| | | | |
|---|---|---|---|
| 2005/0069223 A1* | 3/2005 | Tanimura | G06T 7/73 |
| | | | 382/284 |
| 2014/0285485 A1 | 9/2014 | Jian et al. | |
| 2016/0042558 A1* | 2/2016 | Park | G06T 15/06 |
| | | | 345/426 |
| 2017/0076142 A1 | 3/2017 | Chang | |
| 2017/0287137 A1* | 10/2017 | Lin | G06N 3/08 |
| 2018/0191987 A1 | 7/2018 | Cao et al. | |

FOREIGN PATENT DOCUMENTS

| | | |
|---|---|---|
| CN | 107133604 A | 9/2017 |
| CN | 108124185 A | 6/2018 |
| CN | 108401177 A | 8/2018 |
| CN | 108881995 A | 11/2018 |
| CN | 109151489 A | 1/2019 |
| CN | 109286835 A | 1/2019 |
| WO | 2018196457 A1 | 11/2018 |

OTHER PUBLICATIONS

International Search Report and Written Opinion dated Nov. 4, 2019, Patent Application No. PCT/CN2019/077234, 8 pages.
Chinese First Office Action dated Jan. 26, 2021, Patent Application No. 201910105680.6, 10 pages.

* cited by examiner

METHOD FOR GENERATING VIDEO MASK INFORMATION, METHOD FOR PREVENTING OCCLUSION FROM BARRAGE, SERVER AND CLIENT

CROSS-REFERENCE TO RELATED APPLICATIONS

The present application is a continuation of International Application No. PCT/CN2019/077234, filed on Mar. 6, 2019, which claims benefit of Chinese Application No. 201910105680.6 filed Feb. 1, 2019, the contents of which are incorporated herein by reference in its entirety.

TECHNICAL FIELD

The present disclosure relates to internet technologies, and more particularly to a method for generating video mask information, a method for preventing occlusion from barrage, a server and a client.

BACKGROUND

With a continuous development of barrage technology, barrage information published by a user is often played in a video playback screen in a current live video or video-on-demand field. Bad occlusion effect on a video image being viewed by the user may be caused sometimes while interactivity is enhanced among users in this way.

In view of this, a series of methods have been proposed in existing technologies to prevent the video image from being occluded by the barrage. One implementation is: a barrage shield control element may be set in a player so as to shield the barrage at a specified position in the video image. However, the number of the barrage exhibited will be greatly reduced in this manner, and too many barrages will be lost though the image is not occluded. Another implementation is: a server may generate a binary mask image consistent with the video image, and send the binary mask image to the client together with video data after compressing the binary mask image. The client may, by parsing the binary mask image, learn which areas in the current video image display no barrage information, so that main objects in the video image may be prevented from being occluded while most of the barrage information remains. However, the amount of data of the binary mask image generated in this manner is too large, which greatly increases bandwidth consumption of the client, thereby causing the video to be stuck when the bandwidth of the client is insufficient.

SUMMARY

An objective of some of embodiments of the present disclosure is to provide a method for generating video mask information, a method for preventing occlusion from barrage, a server and a client, which can avoid occlusion caused by barrage information on a video image while most of the barrage information remains in the case of reducing bandwidth consumption of the client.

An embodiment of the present disclosure provides a method for generating video mask information. The method includes: reading video data to be parsed, and identifying, for any video frame in the video data, an area where a target object is located in the video frame; selecting a plurality of geometric figures to fit the area where the target object is located, to allow a combination of the plurality of geometric figures to cover the area where the target object is located; and generating mask information of the video frame according to a fitting parameter of the plurality of geometric figures, and sending the mask information and data of the video frame to a client synchronously.

An embodiment of the present disclosure further provides a server, including a processor and a memory. The memory is used to store a computer program which, when being executed by the processor, implements the method for generating video mask information as described above.

An embodiment of the present disclosure further provides a method for preventing occlusion from barrage. The method includes: receiving video data and barrage data sent by a server, where the video data includes at least mask information of a video frame, the mask information includes a fitting parameter of a plurality of geometric figures, and a combination of the plurality of geometric figures covers the target object in the video frame; parsing the mask information of the video frame to determine, in the video frame, an area where each of the geometric figures is located respectively according to the fitting parameter of the plurality of geometric figures; and displaying no barrage data corresponding to the area where each of the geometric figures is located respectively when the barrage data is rendered in the video frame.

An embodiment of the present disclosure further provides a client, including a processor and a memory. The memory is used to store a computer program which, when being executed by the processor, implements the method for preventing occlusion from barrage as described above.

Compared to existing technologies, the embodiments of the present disclosure may, with respect to the target object that needs to be prevented from being occluded in the video frame, identify the area where the target object is located. Thereafter, the target object in the video frame may be covered by a combination of one or more geometric figures using a geometric figure fitting method. After a plurality of geometric figures covering the target object are determined, a fitting parameter of these geometric figures may be generated, the fitting parameter may indicate a type of each of the geometric figures and a layout of each of the geometric figures in the video frame. The server may then generate the mask information of the video frame based on the fitting parameter and send the mask information to the client together with the data of the video frame. As the fitting parameter of the geometric figures usually occupies a relatively small byte, data amount of the mask information is also relatively small, and the mask information thus does not occupy much additional bandwidth of the client. Subsequently, the client may parse the area where each of the geometric figures is located in the video frame after receiving the data and the mask information of the video frame sent by the server. When the barrage data needs to be rendered in the video frame, the barrage data corresponding to the area where each of the geometric figures is located respectively may be not displayed, while the barrage data may be displayed normally in other areas, so as to avoid the target object from being occluding by the barrage data. As can be seen, a technical solution provided in the present disclosure can reduce the bandwidth consumption of the client by sending the mask information generated based on the fitting parameter of the geometric figures to the client, and avoid the target object from being occluding while a vast majority of the barrage data remains.

BRIEF DESCRIPTION OF THE DRAWINGS

One or more embodiments are described illustratively through the image in accompanying drawings corresponding

DETAILED DESCRIPTION

To make objectives, technical solutions and advantages of the present disclosure more clear, some of the embodiments of the present disclosure are further described in detail below in combination with accompanying drawings and the embodiments. It should be understood that the specific embodiments described herein are merely used to explain the present disclosure and are not intended to limit the present disclosure.

Figure 1:
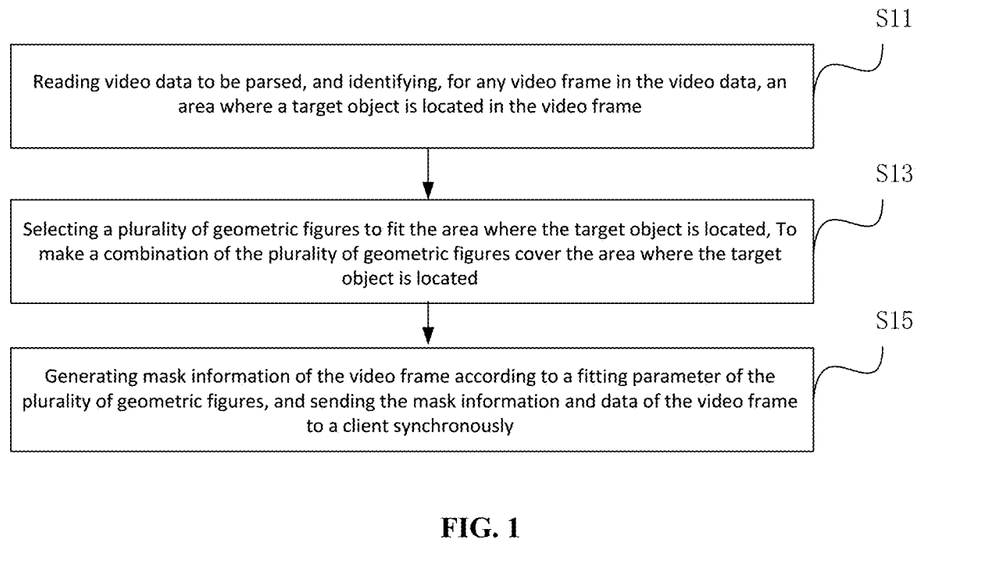
FIG. 1 is a schematic diagram of a method for generating video mask information in the embodiment of the present disclosure.

The present disclosure provides a method for generating video mask information. The method may be applied to a server, and the server may be a server for storing video data. Referring to FIG. 1, the method includes the following steps.

S11: reading video data to be parsed, and identifying, for any video frame in the video data, an area where a target object is located in the video frame.

In this embodiment, the video data to be parsed may be video-on-demand data that has been already uploaded into the server, or the video data of live video stream received by the server, and the video data may include data of each video frame. After the server reads the video data to be parsed, each video frame in the video data may be processed. Specifically, the server may pre-determine a target object in the video data that needs to be avoided from being occluded by a barrage, and the target object may be for example a person appearing in a video image. Of course, the target object may also change flexibly depending on video content. For example, in a live video broadcast showing a daily life of a cat, the target object may be the cat.

In this embodiment, for any video frame in the video data, the server may identify the area where the target object is located in the video frame. Specifically, identification of the target object in the video frame may be realized in many ways. For example, the target object may be identified in the video frame by an instance segmentation algorithm or a semantic segmentation algorithm. In an actual application scenario, the target object may be identified by a neural network system such as Faster-rcnn and Mask-rcnn. Specifically, the video frame may be input into a model of a neural network system above, and location information of the target object included in the video frame may be marked in a result output by this model. The location information may be represented by coordinate values of pixels constituting the target object in the video frame. In this way, a set of coordinate values of the pixels constituting the target object may represent the area where the target object is located in the video frame.

S13: selecting a plurality of geometric figures to fit the area where the target object is located, so that a combination of the plurality of geometric figures covers the area where the target object is located.

Figure 2:
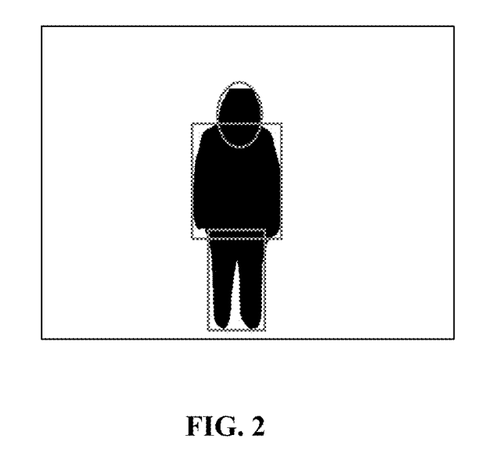
FIG. 2 is a schematic diagram of a target object fitted by geometric figures in the embodiment of the present disclosure.

In this embodiment, one or more geometric figures may be selected to fit the area where the target object is located together after the area where the target object is located in the video frame is determined, and a fitting result may be that the combination of the one or more geometric figures may just cover the area where the target object is located. For example, referring to FIG. 2, the target object to be identified in the current video frame is a human body, and the area where the human body is located in the video frame may be fitted by an ellipse and a rectangle after the human body shown in FIG. 2 is identified in the current video frame. For example, the ellipse may fit a head of the human body, and the rectangle may fit an upper and lower body of the human body.

In this embodiment, the area where the target object is located may be divided into one or more sub-areas according to a physical feature of the target object when the one or more geometric figures mentioned above are determined. Specifically, the physical feature may be flexibly set according to a type of the target object. For example, the physical feature may be a head, a trunk or limbs, or the like, when the target object is a human body. Of course, the number of sub-areas to be divided into may be different according to a different fitting precision. For example, when a requirement for fitting accuracy is not high, the body and limbs may be divided into upper body and lower body without too fine segmentation. In a practical application, the area where the target object is located may be divided into one or more sub-areas by multiple attitude algorithms. For example, the attitude algorithms may include a DensePose algorithm, an OpenPose algorithm, a Realtime multi-person Pose Estimation algorithm, an AlphaPose algorithm, a Human Body Pose Estimation algorithm, a DeepPose algorithm, and the like.

Figure 3:
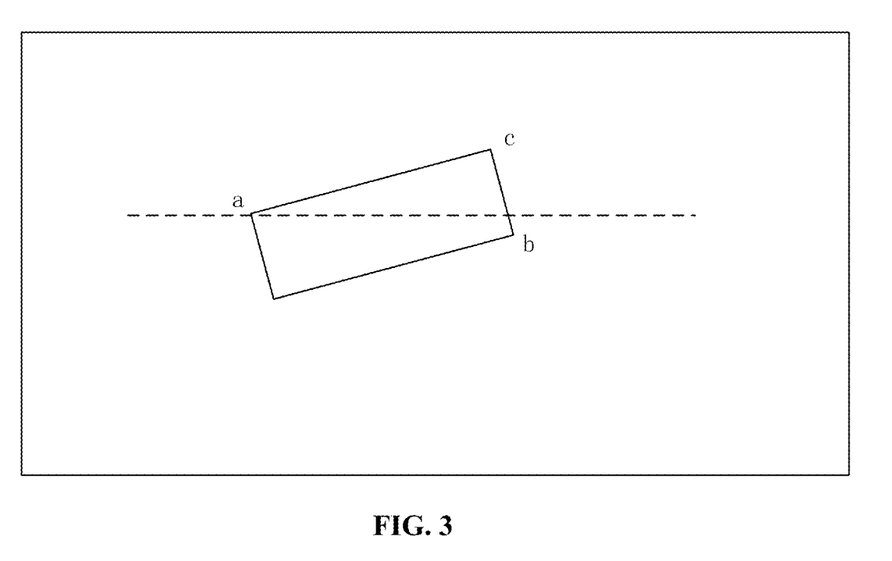
FIG. 3 is a schematic diagram of a rectangular area in the embodiment of the present disclosure.
Figure 4:
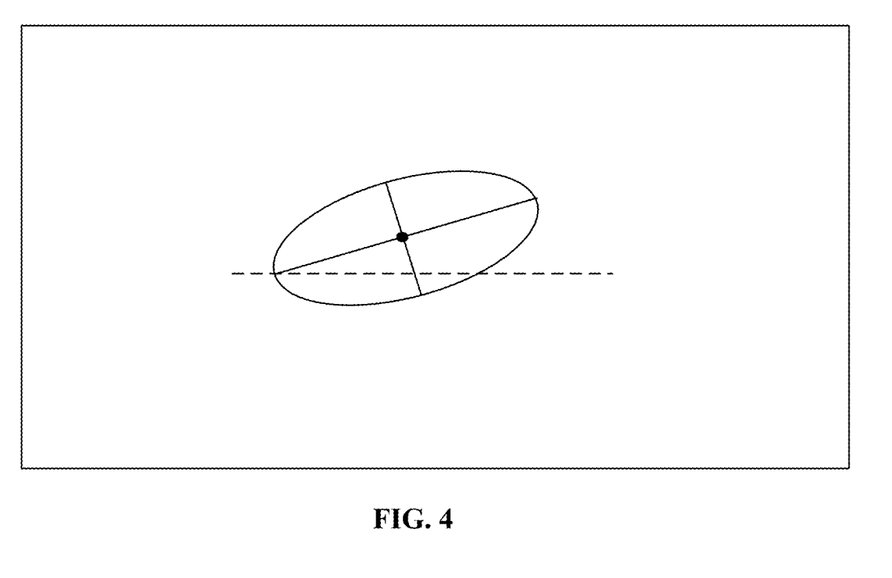
FIG. 4 is a schematic diagram of an ellipse area in the embodiment of the present disclosure.

In this embodiment, after each of the sub-areas is obtained by division, a geometric figure fitting with the sub-area may be selected for any of the sub-areas. For example, an ellipse or a circle may be selected for the head of the human body, while a rectangular may be selected for the trunk and limbs of the human body. Subsequently, a layout parameter of the geometric figure may be further determined, so that the geometric figure drawn according to the layout parameter may cover the sub-area corresponding to the geometric figure. In the practical application, the determined layout parameter may be different depending on the different geometric figure. For example, for the rectangle, the layout parameter may be coordinate values of two diagonal vertices of the rectangle in the video frame, and an angle between a side of the rectangle and a horizontal line. As shown in FIG. 3, coordinate values of vertex a and vertex b and the angle between side ac and the horizontal line (a dotted line in FIG. 3) may be determined in order to determine the layout parameter of the rectangle in the frame video. In this way, the area of the rectangle may be determined in the video frame based on these layout parameters. For another example, the determined layout parameter may include coordinate values of a central point of the ellipse, a long axis and a short axis of the ellipse, and an angle between the long axis and the horizontal line (the dotted line in FIG. 4) in order to determine the area covered by the ellipse in FIG. 4. Again, as another example, the determined layout parameter may include a center and a radius of the circle in order to determine the area covered by the circle.

In this embodiment, a fitting parameter of the geometric figure may be generated according to a type of the selected geometric figure and the layout parameter of the geometric figure. Specifically, the fitting parameter may be represented by a coded value. Specifically, the type of the geometric figure may be represented by a preset graphic identifier. For example, the preset graphic identifier of the circle is 0, the preset graphic identifier of the ellipse is 1, the preset graphic identifier of the rectangle is 2, the preset graphic identifier of the triangle is 3, and the like. The layout parameter of the geometric figure may be represented by coordinate values of the pixels or the number of the covered pixels. For example, the center of the circle may be represented by coordinate values of the pixel at the center, while the radius may be represented by the number of pixels that the radius covers. Both the preset graphic identifier and the layout parameter determined above may be decimal, whereas binary or hexadecimal is usually adopted to represent them in computer languages. Therefore, after the preset graphic identifier and the layout parameter corresponding to the geometric figure are obtained, the preset graphic identifier and the layout parameter may be coded respectively. For example, the preset graphic identifier and the layout parameter may be binary-coded. In the case of a decimal counting mode, the preset graphic identifier of the circle is 0, and with respect to the layout parameter, coordinate values of the center of the circle is (16,32), and the radius is 8. Then after binary-coded, the preset graphic identifier may be 00, the coordinate values of the center of the circle may be represented as 010000 100000, the radius may be represented as 001000, and a combination is 00 010000 100000 001000. Finally, binary-coded data may be used as the fitting parameter of the geometric figure. For each of the geometric figures included in the video frame, the respective fitting parameter may be generated in the above way.

S15: generating mask information of the video frame according to the fitting parameter of the plurality of geometric figures, and sending the mask information and data of the video frame to a client synchronously.

Figure 5:
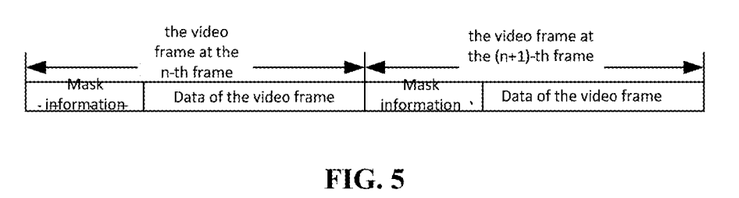
FIG. 5 is a structural schematic diagram of mask information and data of the video frame in the embodiment of the present disclosure.

In this embodiment, the mask information of the video frame may be generated according to the fitting parameter of the plurality of geometric figures after the plurality of suitable geometric figures are selected. Specifically, the mask information may include not only the coded fitting parameter, but also an auxiliary identification bit added for the fitting parameter. The function of adding the auxiliary identification bit is to differentiate between the mask information of the video frame and real data of the video frame. Referring to FIG. 5, the video data sent by the server may be divided into a sequence of video frames, where the mask information of the video frame and the data of the video frame are jointed end to end with respect to the same video frame. If no auxiliary identification bit is added, the client may not distinguish between the mask information and the data of the video frame to be rendered when reading the video data. In view of this, the auxiliary identification bit may be added for the fitting parameter, and a combination of the auxiliary identification bit and the fitting parameter may be used as the mask information of the video frame. When the client reads the video data, the auxiliary identification bit is identified to determine which character segments are the mask information. In the practical application, there are various ways to implement the auxiliary identification bit. For example, the auxiliary identification bit may indicate a data size of the fitting parameter in a binary manner, and the auxiliary identification bit may be a binary number with a specified number of digits preceding the fitting parameter. For example, the auxiliary identification bit may be a binary number of 6 bits, and with respect to a fitting parameter like 00 010000 100000 001000, the data size thereof is 20 bits, so the auxiliary identification bit may be represented as 010100, and the final mask information may be 010100 00 10000 100000 001000. The client may know that the data size of the fitting parameter is 20 bits after reading the auxiliary identification bit of 6 bits, and then may read data content of 20 bits, and regard the data content of 20 bits as the content of the fitting parameter. And the data following the 20 bits may be used as data of the video frame to be rendered.

Figure 6:
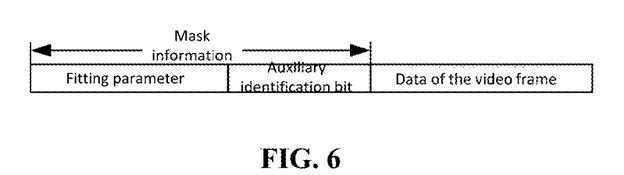
FIG. 6 is a schematic diagram of an implementation of an auxiliary identification bit in the embodiment of the present disclosure.

In addition, in other embodiments, the auxiliary identification bit may further indicate the number of the geometric figures included in the fitting parameter, so the data that continues to be read sequentially is the data of the video frame to be rendered after the client reads, from the video data, the fitting parameter of the geometric figures with the same number of the geometric figures represented by the auxiliary identification bit. Furthermore, the auxiliary identification bit may also indicate a data end position of the fitting parameter. As shown in FIG. 6, the auxiliary identification bit may be a string of preset fixed characters, the client knows that the fitting parameter has been read when reading the fixed characters, and what is following the fixed characters is the data of the video frame to be rendered.

In this embodiment, the mask information and the data of the video frame may be combined as the data to be sent corresponding to the video frame after the auxiliary identification bit is added to generate the mask information of the video frame. The data to be sent corresponding to the plurality of different video frames may be combined to constitute the video data sent to the client. It should be noted that the video data sent by the server to the client is already different from the video data to be parsed in step S11, and the difference is that the video data sent to the client includes the generated mask information of the video frame. In this way, the mask information of the video frame and the data of the video frame may be sent to the client synchronously.

In one embodiment, in order to fit the area where the target object is located in the video frame more conveniently, a binary mask image of the video frame may be generated after the area where the target object is located in the video frame is identified. For each pixel in the binary mask image, there may be only two different pixel values. The pixels constituting the area where the target object is located may have a first pixel value, while the other pixels may have a second pixel value. In the practical application, a size of the generated binary mask image may be consistent with that of the original video frame in order to match with the original video frame. This same size may be interpreted as the same length and width of the image and also the same resolution, so that the number of pixels included in the original video frame is consistent with that included in the generated binary mask image. Of course, in order to reduce amount of data in the binary mask image, the generated binary mask image may include only the area corresponding to the target object without displaying all the areas of the original video frame. In this way, the size of the generated binary mask image may be consistent with the size of one sub-area clipped from the original video frame without being consistent with the size of the original video frame. In this embodiment, the area constituted by pixels with the first pixel value may be fitted directly in the binary mask image through the aforesaid plurality of geometric figures in the above manner after the binary mask image is generated, and thus the fitting parameter of each of the geometric figure may be obtained.

In one embodiment, the fitting parameter of the video frame may also be determined using a machine learning method. Specifically, for different target objects, an identification model may be trained through different training sample sets. First, the training sample set of the target object may be obtained. The training sample set may include a plurality of image samples, and each of the plurality of image samples includes the target object. For training samples, each image sample may be manually tagged to mark out the geometric figures required to cover the target object in each image sample. These tagged geometric figures may be represented by the fitting parameter of the geometric figures. The fitting parameter may include the type of the geometric figures and the layout parameter of the geometric figures. In other words, the fitting parameter corresponding to each image sample may be generated when tagging the training samples, and the fitting parameter may be used as a tagged label of the image sample.

Thereafter, the preset identification model may be trained by manually tagged image samples. The identification model may include a deep neural network in which a neuron may have an initial weight value. After the input image samples are processed by the deep neural network with the initial weight value, a prediction result corresponding to the input image samples may be obtained. The prediction result may indicate the fitting parameter of the geometric figures required to cover the target object in the input image samples. Since the weight value of the identification model in an initial stage is not accurate, there is a certain gap between the fitting parameter represented by the prediction result and that manually tagged. Then, after the predicted result is obtained, a difference value between the fitting parameter represented by the predicted result and the manually tagged fitting parameter may be calculated and provided to the identification model as feedback data, so as to change the weight value of the neurons in the identification model. In this way, after any image sample is input into the trained identification model, the prediction result output by the trained identification model may be finally consistent with the fitting parameter represented by the tagged label of the input image sample through repeated correction of the weight value, so that a training process may be completed.

Subsequently, the video frame may be input into the trained identification model when the fitting parameter of the video frame needs to be determined, and the prediction result output by the trained identification model may be taken as the fitting parameter of the video frame.

In one embodiment, as the number of geometric figures required to fit the target object may be more than one, the final mask information actually includes the fitting parameter of a plurality of geometric figures. In the practical application, the plurality of fitting parameters in the mask information may be sorted according to a size of the geometric figures. Specifically, the fitting parameters of each of the geometric figures may be sorted according to the size of the geometric figures represented by the fitting parameters thereof, and the mask information of the frame video may be generated based on the sorted fitting parameters. For example, an order arranged from the first to the last one by one of the fitting parameters in the mask information may correspond to the order of sizes of the geometric figures from large to small respectively. The purpose of processing in this way is that the client needs to determine whether a pixel in the video frame falls into the geometric figure covering the target object when receiving the mask information sent by the server. If the pixel falls into the geometric figure, it means that content of the video frame on the pixel needs to be displayed, and the content of the video frame cannot be occluded by barrage information, so the barrage information on the pixel cannot be displayed. However, in the practical application, the pixel needs to be analyzed one by one with respect to each of the geometric figures in the mask information, so that whether the pixel falls into one of the geometric figures may be determined. If the fitting parameter of the geometric figure with a larger size ranks at top of the mask information, then a probability of the pixel falls into the geometric figure may be larger. Once detected as falling into one of the geometric figures, the pixel may be determined immediately not to display the barrage information, so that a determination process for this pixel stops, and a next pixel is continued to be analyzed. Therefore, the fitting parameters in the mask information are arranged according to sizes of the geometric figures from large to small, which can reduce a time for determining whether the pixel dot falls into the geometric figure, thus speeding up a rendering process of the image at the client.

Figure 7:
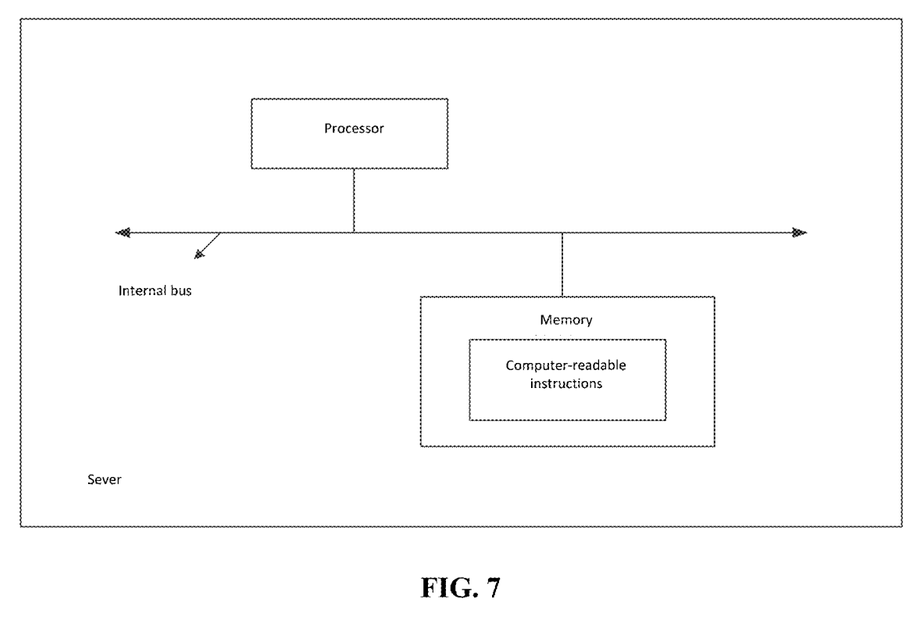
FIG. 7 is a structural schematic diagram of a server in the embodiment of the present disclosure.

Referring to FIG. 7, the present disclosure further provides a server. The server includes a memory and a processor, and the memory is used to store a computer program that, when executed by the processor, may implement the method for generating mask information as described above. Specifically, as shown in FIG. 7, the server may include a processor, an internal bus, and a memory at the hardware level. The memory may include an internal memory and a non-volatile memory. The processor reads the corresponding computer program from the non-volatile memory into the internal memory and runs it. A person of ordinary skill in the art will understand, a structure shown in FIG. 7 is only schematic and does not limit the structure of the aforesaid server. For example, the server may include more or fewer components than what is shown in FIG. 7. For example, the server may include additional processing hardware, such as a GPU (Graphics Processing Unit), or it may have a different configuration than what is shown in FIG. 7. Of course, in addition to the software implementation, the present disclosure does not exclude other implementations, such as a logic device or a combination of a software and a hardware, and the like.

In this embodiment, the processor may include a central processing unit (CPU) or a graphics processor (GPU), and may include other single-chip microcomputers, logic gates, integrated circuits, and the like, of course, which have a logical processing capability, or an appropriate combination thereof. The memory in this embodiment may be a memory device for storing information. In a digital system, a device that may store binary data may be a memory; in an integrated circuit, a circuit with no physical form but with a storage function may also be a memory, such as RAM, FIFO, and the like; and in a system, a storage device with a physical form may be also called a memory, and the like. When being implemented, the memory may also be implemented in the way of adopting a cloud memory, and the specific implementation is not limited in this specification.

It should be noted that the specific implementation of the server in this specification may refer to a description of the method embodiment, and no details are listed again herein.

The present disclosure further provides a method for preventing occlusion from barrage, which can be applied to a client. The client may be an electronic device with a video playing function, or a video player running in the electronic device. Specifically, referring to FIG. 8, the method may include the following steps.

Figure 8:
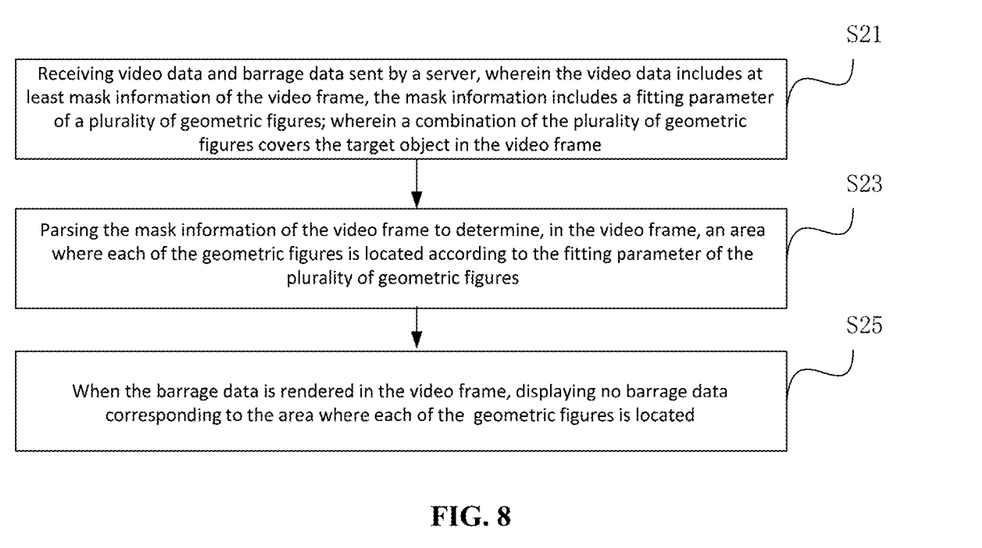
FIG. 8 is a schematic diagram of a method for preventing occlusion from barrage in the embodiment of the present disclosure.

S21: receiving video data and barrage data sent by a server, where the video data includes at least mask information of a video frame, the mask information includes a fitting parameter of a plurality of geometric figures and a combination of the plurality of geometric figures covers a target object in the video frame.

In this embodiment, after generating the mask information of the video frame, the server may send the mask information and data of the video frame as the processed video data to the client, and may also simultaneously send the barrage data of a current video to the client, where the content in the barrage data keeps synchronized with the video frame. An added auxiliary identification bit and the fitting parameter of each of the geometric figures may be included in the mask information, and the combination of these geometric figures may just cover the target object in the video frame.

S23: parsing the mask information of the video frame to respectively determine an area where each of the geometric figures is located in the video frame according to the fitting parameter of the plurality of geometric figures.

In this embodiment, by identifying the auxiliary identification bit in the mask information, the client may identify a character segment of the mask information in the video data according to the auxiliary identification bit. Specifically, the auxiliary identification bit may indicate a data size of the fitting parameter in a binary manner, and the auxiliary identification bit may be a binary number with a specified number of digits preceding the fitting parameter. In this way, the client may know the data size of the fitting parameter after reading the auxiliary identification bit with the specified number of digits, so that data content of the fitting parameter may be read according to the data size of the fitting parameter. Thus, the auxiliary identification bit and the data content of the fitting parameter may be used as the character segment of the mask information of the video frame.

Furthermore, in other embodiments, the auxiliary identification bit may further indicate the number of geometric figures included in the fitting parameter, and the client may read, from the video data, the fitting parameter of the geometric figures with the same number of the geometric figures represented by the auxiliary identification bit, and the read fitting parameter and the read auxiliary identification bit are used as the character segment of the mask information of the video frame. Furthermore, the auxiliary identification bit may further indicate a data end position of the fitting parameter. The auxiliary identification bit may be a string of preset fixed characters, and the client may know that the fitting parameter has been read when reading the fixed characters. Thus, the client may set a combination of the data content preceding the fixed characters and the fixed characters as the character segment of the mask information of the video frame.

In this embodiment, the client may determine the fitting parameter of the plurality of geometric figures by parsing the identified character segments of the mask information, and may determine the area where each of the geometric figures is located in the video frame respectively. Specifically, the manner in which the area is determined may differ depending on a type of the geometric figure. For example, for a circle, the area where it is located may be represented by a following formula:

$$(x-a)^2+(y-b)^2 \leq r^2.$$

(x,y) that satisfies the above formula may represent coordinate values of a pixel in the circle area, and (a,b) may represent coordinate values of a center of the circle, and r may represent a radius of the circle.

For a different geometric figure, the area where it is located may be represented always by a mathematical formula.

S25: displaying no barrage data corresponding to the area where each of the respective geometric figures is located when the barrage data is rendered in the video frame.

In this embodiment, after the area where each of the geometric figures is located in the current video frame is determined, when the barrage data corresponding to the area where each of the geometric figures is located is rendered in the video frame, the barrage data may be not displayed corresponding to the area where the geometric figure is located, and the barrage data may be displayed normally in other areas outside the geometric figure, so that the barrage data in the current video frame will not occlude the target object covered by the combination of the geometric figure.

In a practical application, each pixel in the video frame may be determined one by one. Specifically, with respect to the current pixel in the video frame, whether the current pixel falls into an area where the geometric figure is located is determined. The method for determining whether the current pixel falls into an area where the geometric figure is located may be: coordinate values of the current pixel are substituted into the mathematical formula of the current geometric figure to be determined, and if the mathematical formula holds true, it indicates that the current pixel falls into the geometric figure to be determined. Conversely, if the mathematical formula does not hold, it indicates that the current pixel is outside the geometric figure to be determined. Thus, if the current pixel is located in the area where any of the geometric figures is located, the barrage data corresponding to the area where any of the geometric figures is located is not displayed at the current pixel. And if the current pixel is located outside the area where each of the geometric figures is located, the barrage data corresponding to the area outside the area where each of the geometric figures is located is displayed at the current pixel. Thus, when the barrage data corresponding to the area where any of the geometric figures is located is determined not to be displayed, the current pixel needs to fall into any of the geometric figures, and when the barrage data corresponding to the area outside the area where each of the geometric figures is located is determined to be displayed, the current pixel needs to be located in the area outside all the geometric figures.

In the practical application, since the fitting parameter of the geometric figure is arranged in order in the mask information, whether the current pixel falls into any geometric figure is determined one by one based on an arrangement order of the fitting parameter of the geometric figure in the mask information. In one embodiment, in order to save a time required for a determination process for the current pixel, the fitting parameter of each of the geometric figures in the mask information sent by the server may be sorted according to a size of the geometric figure. Specifically, the fitting parameter of the geometric figure with a larger size may be arranged at top of the mask information. In this way, the geometric figure with a larger size may be preferred to be determined when the client determines whether the current pixel falls into the geometric figure. Since a probability that the pixel falls into the geometric figure with a larger size is larger, when whether the current pixel falls into the area where each of the geometric figure is located is determined one by one according to the sorting result of the fitting parameter of the geometric figure, once that the current pixel falls into the area where the current geometric figure is located is detected, that the barrage data corresponding to the area where the current geometric figure is located is not to be displayed at the current pixel may be immediately determined, and the determination process for the current pixel may stop, and then, whether the next pixel falls into the area where each of the geometric figures is located may be continued to be determined. Therefore, the fitting parameter arranged in the mask information according to the size of the geometric figure from large to small can reduce the time required for determining whether the pixel falls into the geometric figure, thereby speeding up a rendering process of the image at the client.

The present disclosure further provides a client, including a processor and a memory. The memory is used to store a computer program which, when being executed by the processor, implements the method for preventing occlusion from barrage as described above.

It should be noted that, the specific implementations of the client in this specification may refer to description of the method embodiment, and details are not described again herein.

As is seen above, technical solutions of the present disclosure may, with respect to a target object that needs to be prevented from being occluded in the video frame, identify the area where the target object is located. Thereafter, the target object in the video frame may be covered by one geometric figure or a combination of more geometric figures using a geometric figure fitting method. After a plurality of geometric figures covering the target object is determined, a fitting parameter of these geometric figures may be generated, and the fitting parameter may indicate a type of each of the geometric figures and a layout of each of the geometric figures in the video frame. The server may then generate the mask information of the video frame based on the fitting parameter and send the mask information to the client together with data of the video frame. Because the fitting parameter of the geometric figures usually occupies a relatively small byte, the data amount of the mask information is also relatively small, and the mask information thus does not occupy much additional bandwidth of the client. Subsequently, the client may parse the area where each of the geometric figures is located in the video frame after receiving the data and the mask information of the video frame sent by the server. When the barrage data needs to be rendered in the video frame, the barrage data corresponding to the area where each of the geometric figures is located may not be displayed, while the barrage data may be displayed normally in other areas, so as to avoid the target object from being occluded by the barrage data. As can be seen, the technical solution provided in the present disclosure can reduce the bandwidth consumption of the client by sending the mask information generated based on the fitting parameter of the geometric figures to the client, and in addition, the technical solution can avoid the target object from being occluded while the vast majority of barrage data remains.

Through the description of the above embodiments, a person skilled in the art may clearly understand that each of the embodiments may be implemented via software plus a necessary general hardware platform, and may, of course, be implemented by hardware. Based on such understanding, an essence or a part that contribute to the existing technologies of the above-described technical solutions may be embodied in a form of a software product, the computer software product may be stored in a computer-readable storage medium such as ROM/RAM, a magnetic disc, a compact disk, and the like, and may include instructions for enabling a computer device (which may be a personal computer, a server, or a network device, and the like) to perform the methods described in each of the embodiments or some of the embodiments.

The above description is only the preferred embodiments of the present disclosure, and is not intended to limit the present disclosure. Any modifications, equivalent substitutions, improvements, and the like, which fall within the spirit and principle of the present disclosure should be included within the protection scope of the present disclosure.

What is claimed is:

1. A method for generating video mask information, comprising:
    reading video data to be parsed, and identifying, for any video frame in the video data, an area where a target object is located in the video frame;
    selecting a plurality of geometric figures to fit the area where the target object is located, to allow a combination of the plurality of geometric figures to cover the area where the target object is located; and
    generating mask information of the video frame according to a fitting parameter of the plurality of geometric figures, and sending the mask information and data of the video frame to a client synchronously;
    wherein the mask information includes the fitting parameter of the plurality of geometric figures, and the mask information indicates that no barrage data is displayed corresponding to the area where each of the plurality of geometric figures is located when the barrage data is rendered in the video frame.

2. The method of claim 1, wherein, after identifying an area where a target object is located in the video frame, the method further comprises:
    generating a binary mask image of the video frame, wherein in the binary mask image, pixels constituting the area where the target object is located have a first pixel value, and other pixels have a second pixel value, wherein the first pixel value and the second pixel value are different.

3. The method of claim 2, wherein selecting a plurality of geometric figures to fit the area where the target object is located comprises:
    in the binary mask map, fitting an area constituted by the pixels having the first pixel value through the plurality of geometric figures.

4. The method of claim 2, wherein selecting a plurality of geometric figures to fit the area where the target object is located comprises:
    dividing the area where the target object is located into one or more sub-areas according to physical features of the target object;
    selecting, for any of the sub-areas, a geometric figure fitting with the sub-area, and determining a layout parameter of the geometric figure, to allow the geometric figure drawn according to the layout parameter to cover the sub-area; and
    generating a fitting parameter of the geometric figure according to a type of the selected geometric figure and the layout parameter of the selected geometric figure.

5. The method of claim 4, wherein generating a fitting parameter of the geometric figure comprises:

identifying a preset graphic identifier corresponding to the type of the geometric figure, coding the preset graphic identifier and the layout parameter respectively, and taking coded data as the fitting parameter of the geometric figure.

6. The method of claim 1, wherein selecting a plurality of geometric figures to fit the area where the target object is located comprises:
dividing the area where the target object is located into one or more sub-areas according to physical features of the target object;
selecting, for any of the sub-areas, a geometric figure fitting with the sub-area, and determining a layout parameter of the geometric figure, to allow the geometric figure drawn according to the layout parameter to cover the sub-area; and
generating a fitting parameter of the geometric figure according to a type of the selected geometric figure and the layout parameter of the selected geometric figure.

7. The method of claim 6, wherein generating a fitting parameter of the geometric figure comprises:
identifying a preset graphic identifier corresponding to the type of the geometric figure, coding the preset graphic identifier and the layout parameter respectively, and taking coded data as the fitting parameter of the geometric figure.

8. The method of claim 1, wherein generating mask information of the video frame according to a fitting parameter of the plurality of geometric figures comprises:
adding an auxiliary identification bit to the fitting parameter, and regarding a combination of the auxiliary identification bit and the fitting parameter as the mask information of the video frame; wherein the auxiliary identification bit includes at least one of the following functions:
indicating a data size of the fitting parameter;
indicating the number of geometric figures included in the fitting parameter; or
indicating a data end position of the fitting parameter.

9. The method of claim 1, wherein the fitting parameter of the video frame is generated in a following manner:
acquiring a training sample set of the target object in advance, wherein the training sample set includes a plurality of image samples each of which includes the target object, and each of the image samples is provided with a tagged label used to represent a fitting parameter of the geometric figure required to cover the target object in the image sample;
training an identification model by using the image samples of the training sample set, to allow, after any image sample is input into a trained identification model, a predicted result output by the trained identification model to be consistent with the fitting parameter represented by the tagged label of the input image sample; and
inputting the video frame into the trained identification model, and regarding the predicted result output by the trained identification model as the fitting parameter of the video frame.

10. The method of claim 1, wherein generating mask information of the video frame according to a fitting parameter of the plurality of geometric figures comprises:
sorting the fitting parameter of each of the geometric figures according to a size of the geometric figure represented by the fitting parameter, and generating the mask information of the video frame based on the sorted fitting parameter.

11. A server, comprising at least a processor and a memory, the memory being used to store computer-readable instructions which, when being executed at least a processor, performs a method for generating video mask information; wherein the method comprises:
reading video data to be parsed, and identifying, for any video frame in the video data, an area where a target object is located in the video frame;
selecting a plurality of geometric figures to fit the area where the target object is located, to allow a combination of the plurality of geometric figures to cover the area where the target object is located; and
generating mask information of the video frame according to a fitting parameter of the plurality of geometric figures, and sending the mask information and data of the video frame to a client synchronously;
wherein the mask information includes the fitting parameter of the plurality of geometric figures, and the mask information indicates that no barrage data is displayed corresponding to the area where each of the plurality of geometric figures is located when the barrage data is rendered in the video frame.

12. The server of claim 11, wherein, after identifying an area where a target object is located in the video frame, the method further comprises:
generating a binary mask image of the video frame, wherein in the binary mask image, pixels constituting the area where the target object is located have a first pixel value, and other pixels have a second pixel value, wherein the first pixel value and the second pixel value are different.

13. The server of claim 11, wherein selecting a plurality of geometric figures to fit the area where the target object is located comprises:
dividing the area where the target object is located into one or more sub-areas according to physical features of the target object;
selecting, for any of the sub-areas, a geometric figure fitting with the sub-area, and determining a layout parameter of the geometric figure, to allow the geometric figure drawn according to the layout parameter to cover the sub-area; and
generating a fitting parameter of the geometric figure according to a type of the selected geometric figure and the layout parameter of the selected geometric figure.

14. The server of claim 13, wherein generating a fitting parameter of the geometric figure comprises:
identifying a preset graphic identifier corresponding to the type of the geometric figure, coding the preset graphic identifier and the layout parameter respectively, and taking coded data as the fitting parameter of the geometric figure.

15. The server of claim 11, wherein the fitting parameter of the video frame is generated in a following manner:
acquiring a training sample set of the target object in advance, wherein the training sample set includes a plurality of image samples each of which includes the target object, and each of the image samples is provided with a tagged label used to represent a fitting parameter of the geometric figure required to cover the target object in the image sample;
training an identification model by using the image samples of the training sample set, to allow, after any image sample is input into a trained identification model, a predicted result output by the trained identification model to be consistent with the fitting parameter represented by the tagged label of the input image sample; and inputting the video frame into the trained identification model, and regarding the predicted result output by the trained identification model as the fitting parameter of the video frame.

16. The server of claim 11, wherein generating mask information of the video frame according to a fitting parameter of the plurality of geometric figures comprises:

sorting the fitting parameter of each of the geometric figures according to a size of the geometric figure represented by the fitting parameter, and generating the mask information of the video frame based on the sorted fitting parameter.

17. A method for preventing occlusion from barrage, wherein the method comprises:

receiving video data and barrage data sent by a server, wherein the video data includes at least mask information of a video frame, and the mask information includes a fitting parameter of a plurality of geometric figures; wherein a combination constituted by the plurality of geometric figures covers a target object in the video frame;

parsing the mask information of the video frame to determine, in the video frame, an area where each of the geometric figures is located according to the fitting parameter of the plurality of geometric figures; and displaying no barrage data corresponding to the area where each of the geometric figures is located when the barrage data is rendered in the video frame.

18. The method of claim 17, wherein displaying no barrage data corresponding to the area where each of the geometric figures is located comprises:

determining, for a current pixel in the video frame, whether the current pixel falls into the area where a geometric figure is located; and wherein determining, for a current pixel in the video frame, whether the current pixel falls into the area where the geometric figure is located comprises:

if the current pixel is located in the area where any of the geometric figures is located, displaying no barrage data corresponding to the area where any of the geometric figures is located at the current pixel; and if the current pixel is located outside the area where each of the geometric figures is located, displaying the barrage data corresponding to the area outside the area where each of the geometric figures is located at the current pixel.

19. The method of claim 18, wherein in the mask information, the fitting parameter of each of the geometric figure is sorted according to a size of the geometric figure;

according to a sorted result of the fitting parameter of the geometric figure, whether the current pixel falls into the area where each of the geometric figures is located is determined one by one; wherein if the current pixel is determined to fall into the area where a current geometric figure is located, the barrage data corresponding to the area where the current geometric figure is located is not displayed at the current pixel, and a determination process for the current pixel is stopped, and whether a next pixel falls into the area where each of the geometric figures is located is continued to be determined.

20. The method of claim 17, wherein the mask information of the video frame further includes an auxiliary identification bit of the fitting parameter of the plurality of geometric figures, wherein the auxiliary identification bit includes at least one of the following functions:

indicating a data size of the fitting parameter;

indicating the number of geometric figures included in the fitting parameter; or indicating a data end position of the fitting parameter; and wherein parsing the mask information of the video frame comprises:

identifying a character segment of the mask information in the video data according to the auxiliary identification bit, and parsing the identified character segment of the mask information.

* * * * *